United States Patent
Takamoto

(10) Patent No.: US 7,721,131 B2
(45) Date of Patent: May 18, 2010

(54) HOST APPARATUS AND INFORMATION PROCESSING SYSTEM USING THE SAME

(75) Inventor: Akio Takamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 608 days.

(21) Appl. No.: 11/606,710

(22) Filed: Nov. 29, 2006

(65) Prior Publication Data

US 2007/0124617 A1 May 31, 2007

(30) Foreign Application Priority Data

Nov. 30, 2005 (JP) ............................. 2005-345390

(51) Int. Cl.
*G06F 1/30* (2006.01)
(52) U.S. Cl. ........................................ 713/323; 710/18
(58) Field of Classification Search .................. 713/310, 713/323; 710/18
See application file for complete search history.

(56) References Cited

U.S. PATENT DOCUMENTS

| | | | |
|---|---|---|---|
| 5,923,889 A | 7/1999 | Kim et al. | |
| 2004/0073824 A1 | 4/2004 | Machida | |
| 2004/0125399 A1 | 7/2004 | Kobayashi | |
| 2005/0044430 A1 | 2/2005 | Cheshire | |
| 2006/0191435 A1 | 8/2006 | Fujihara | |

FOREIGN PATENT DOCUMENTS

| | | |
|---|---|---|
| CN | 1189638 A | 8/1998 |
| EP | 1046979 A | 10/2000 |
| JP | 2001-047692 | 2/2001 |
| JP | 2002-019231 | 1/2002 |
| WO | WO 00/28402 | 5/2000 |
| WO | WO 2004/080000 | 9/2004 |

OTHER PUBLICATIONS

Extended European Search Report issued in EP 06 02 4717 by the European Patent Office on May 25, 2008.

*Primary Examiner*—Albert Wang
(74) *Attorney, Agent, or Firm*—Nutter McClennen & Fish LLP; John J. Penny, Jr.

(57) ABSTRACT

In an information processing system, a host apparatus and a device are communicatively connected such that the host apparatus serves as a master and the device serves as a slave. The device is configured to establish a power-saving mode, when any command is not received from the host apparatus for a prescribed time period. A device driver is provided in the host apparatus. The device driver is configured to transit from a normal state to a suspended state when an operation command for operating the device is not received from an application running in the host apparatus for a prescribed time period, and to transmit a dummy response to the application, when an inquiry command is received from the application while the device driver is placed in the suspended state, without notifying the inquiry command to the device.

8 Claims, 4 Drawing Sheets

HOST APPARATUS AND INFORMATION PROCESSING SYSTEM USING THE SAME

Priority is claimed from Japanese Patent Application 2005-345390 filed on Nov. 30, 2005, which is hereby incorporated by reference in its entirety.

BACKGROUND

1. Technical Field

The present invention relates to a technique for activating a device in a power-saving mode when a host apparatus and a device are connected together by a communication system which assigns the host apparatus as a master and the device as a slave.

2. Related Art

A device, such as a printer, connected to a host apparatus establishes a power-saving mode when there is no access from the host apparatus over a prescribed time period. Such a configuration is disclosed in, for example, International Patent Publication No. WO00/28402.

However, when the host apparatus and the device are connected to each other by a USB (Universal Serial Bus), the following problems arise. Specifically, according to the USB, communication is effected while the host apparatus is acts as a master and the device acts as a slave. Accordingly, the host apparatus in principle causes the device to check, at a short cycle, a status and whether or not a request to the host apparatus is present.

Therefore, the device connected to the host apparatus by the USB frequently receives inquiries from the host apparatus, which hinders the device from establishing a power-saving mode.

SUMMARY

It is therefore one advantageous aspect of the invention is to save the power that is consumed by the device when a host apparatus and a device are connected together under a communication system in which the host apparatus acts as a master and the device acts as a slave.

According to one aspect of the invention, there is provided an information processing system, comprising:

a host apparatus, serving as a master;

a device, communicatively connected to the host apparatus and serving as a slave, the device being configured to establish a power-saving mode, when a command is not received from the host apparatus for a prescribed time period; and a device driver, provided in the host apparatus, the device driver being configured to transit from a normal state to a suspended state when an operation command for operating the device is not received from an application running in the host apparatus for a prescribed time period, and to transmit a dummy response to the application, when an inquiry command is received from the application while the device driver is placed in the suspended state, without notifying the inquiry command to the device.

The information processing system may further comprises: a USB device controller, provided in the device; and a USB host controller, provided in the host apparatus and adapted to perform communications, by way of a USB, with the USB device controller.

The device driver may be configured to transit from the suspended mode to the normal mode, when the USB host controller receives a resume signal from the USB device controller.

The device may be a printer. Here, the inquiry command may include a command for inquiring a status of the printer and a command for inquiring a presence of a request from the printer to the host apparatus. The operation command may be a command for causing the printer to perform printing.

According to one aspect of an embodiment of the invention, there is provided a host apparatus, adapted to serve as a master in a case where the host apparatus is communicatively connected to a device serving as a slave and configured to establish a power-saving mode, when any command is not received from the host apparatus for a prescribed time period, the host apparatus comprising:

a device driver, configured to be placed in a suspended state when an operation command for operating the device is not received from an application running in the host apparatus for a prescribed time period, and to transmit a dummy response to the application, when an inquiry command is received from the application while the device driver is placed in the suspended state, without notifying the inquiry command to the device.

According to one aspect of an embodiment of the invention, there is provided a power saving method executed in an information processing system in which a host apparatus and a device are communicatively connected such that the host apparatus serves as a master and the device serves as a slave, the method comprising:

running an application in the host apparatus;

placing the host apparatus in a suspended state when an operation command for operating the device is not received from the application;

transmitting a dummy response to the application, when an inquiry command is received from the application while the device driver is placed in the suspended state, without notifying the inquiry command to the device; and establishing a power-saving mode of the device when the device receives no command from the host apparatus for a prescribed time period.

According to one aspect of the invention, there is provided a program product comprising a computer-readable medium recording a program causing a computer to execute the above method.

BRIEF DESCRIPTION OF THE DRAWINGS

These and other aspects and advantages of the present invention will be described in detail with reference to the accompanying drawings.

DETAILED DESCRIPTION OF EXEMPLARY EMBODIMENTS

Exemplary embodiments of the invention will be described below in detail with reference to the accompanying drawings.

Figure 1:
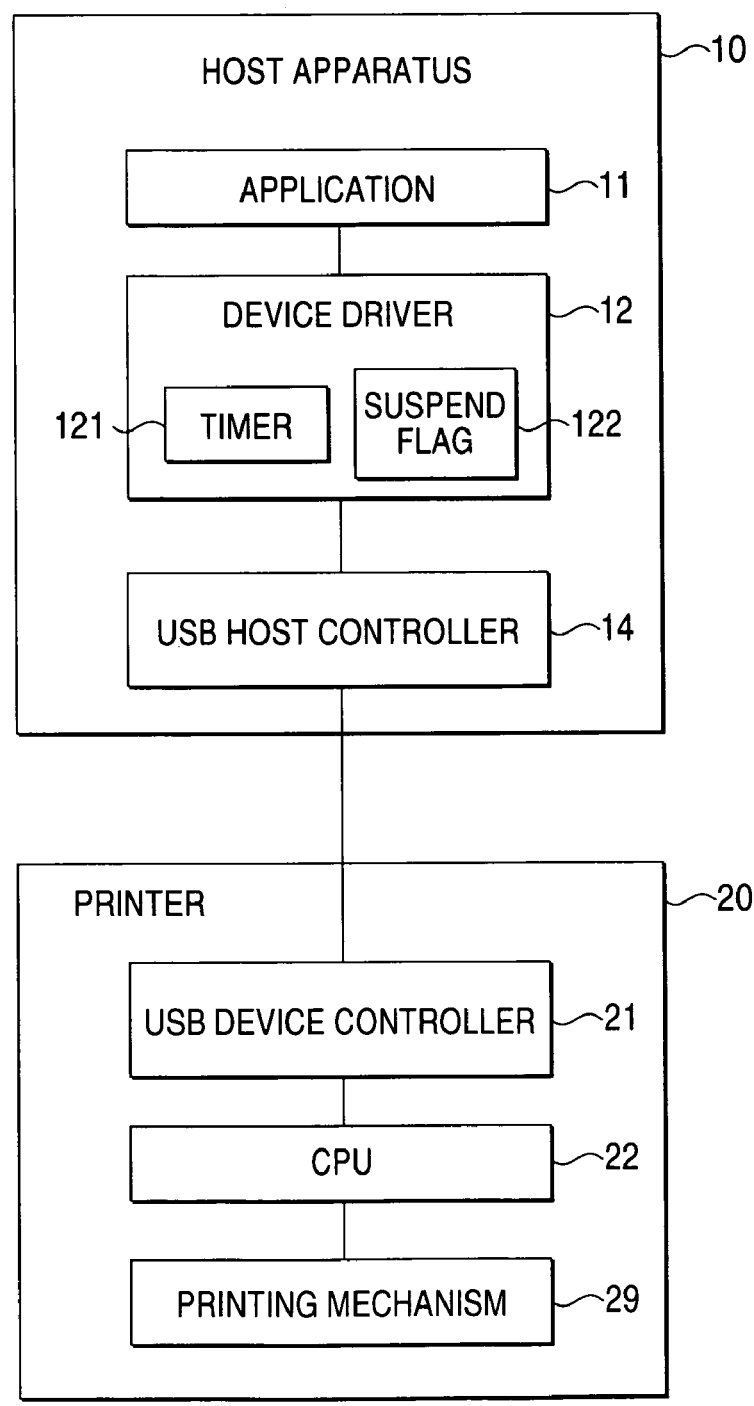
FIG. 1 is a block diagram showing an information processing system according to one embodiment of the invention.

FIG. 1 shows a print system 1 according to one embodiment of the present invention when a printer is used as a device.

The print system 1 comprises a host apparatus 10 and a printer 20. Communication is effected between the host apparatus 10 and the printer 20 by the USB (Universal Serial Bus).

The host apparatus 10 is provided as, for example, a general-purpose computer system. Individual constituent elements or functions in the host apparatus 10, which will be described below, are realized by executing a computer program.

The host apparatus 10 comprises an application 11 such as a printer driver, a device driver 12, and a USB host controller 14.

The device driver 12 controls a printer 20 serving as a device. The device driver 12 also has a timer 121. When waiting for a request, such as a command, from the application 11, the timer 121 measures a time period which has elapsed from when a previous request from the application 11 was received.

As will be described later, when a request, such as a print request, is not issued for a prescribed time period, the device driver 12 is placed in a suspended state. -Accordingly, the device driver 12 has a suspend flag 122 showing whether or not the current state is a suspended state.

The USB host controller 14 establishes, as a USB host, communication with the printer 20 serving as a USB device. Specifically, the USB host controller 14 establishes communication with a USB device controller 21 provided in the USB device.

For instance, when the application 11 outputs a print request, a printer status inquiry command, a data request command, and the like, the device driver 12 receives the output and notifies the printer 20 of the output as a request by way of the USB host controller 14.

The application 11 issues, at a prescribed cycle, an inquiry command such as a status inquiry command, a data request command, and the like. This is attributable to the master-slave relationship existing between the host apparatus and the printer. Specifically, when communication is effected while maintaining the master-slave relationship as in the case of the USB, the slave in principle cannot voluntarily transmit information, and responds to a request from the host apparatus. Accordingly, the host apparatus 10 serving as a master must periodically send an inquiry command to the printer 20 serving as a slave, to thus acquire data or a request from the printer 20.

The printer 20 comprises the USB device controller 21, a CPU 22 controlling the entirety of the printer 20, and a printing mechanism 29 having a print head and a sheet feeding mechanism.

The USB device controller 21 operates as a slave to the USB host controller 14, and effects communication complying with the USB standards.

For instance, when the USB device controller 21 receives a print request from the USB host controller 14, the printing mechanism 29 performs a printing operation after the CPU 22 has performed prescribed processing. Moreover, upon receipt of a status inquiry command from the host apparatus 10 by way of the USB device controller 21, the CPU 22 returns the status of the printer 20 achieved at that time. Alternatively, upon receipt of a data request command from the host apparatus 10, the USB device controller 21 notifies the USB host controller 14 of that request so long as there is any request, such as a data transfer, to the host apparatus 10.

In this embodiment, when a request from the host apparatus 10 is not received for a prescribed time period, the printer 20 establishes a power-saving mode. Here, the power consumed by; e.g., the CPU 22 and the printing mechanism 29, is saved.

When USB communication is used between the host apparatus and the printer, an inquiry command is periodically transmitted from the host apparatus 10. Hence, the printer 20 cannot establish the power-saving mode. Accordingly, the device driver 12 saves the power consumed by the printer 20 in the following manner.

Figure 2:
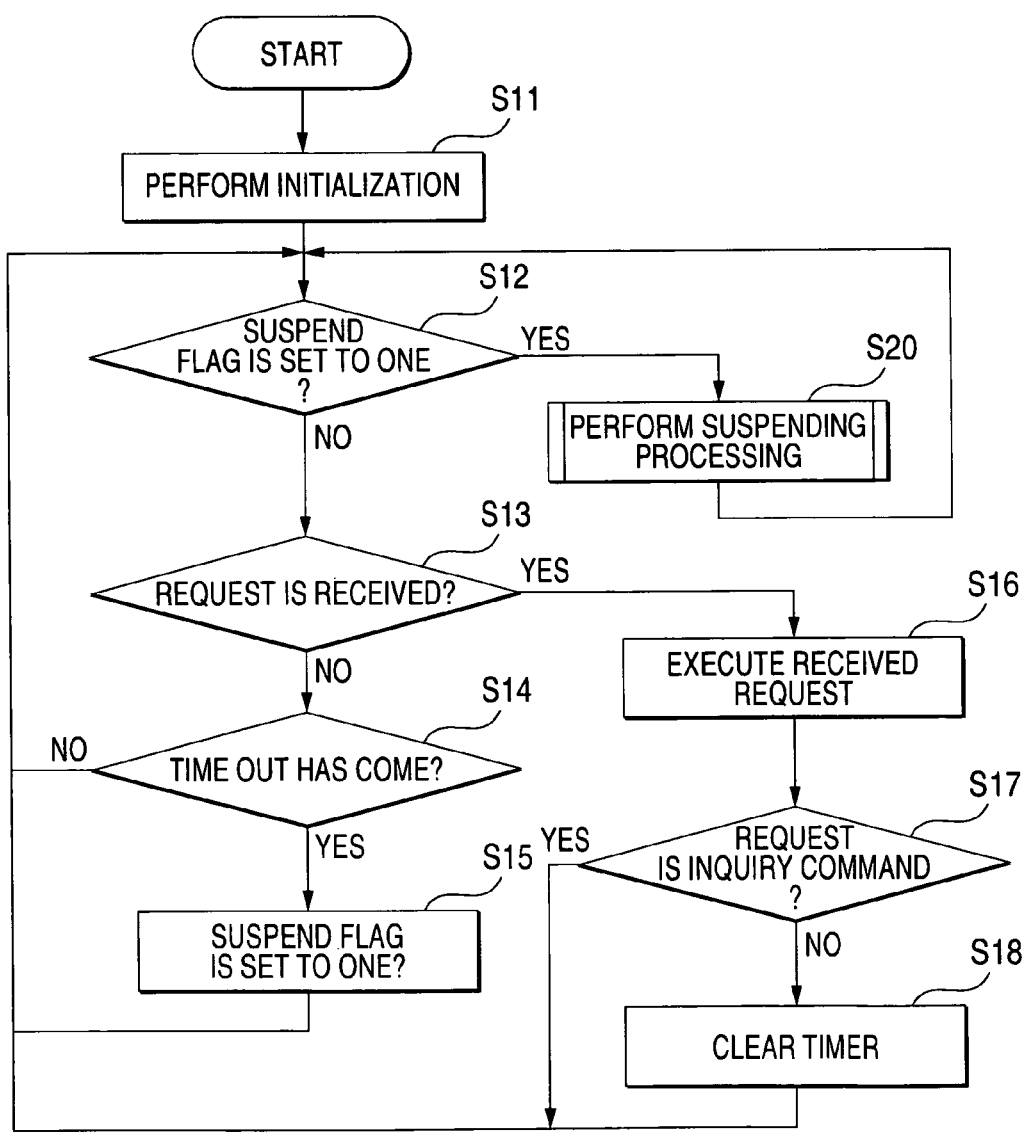
FIG. 2 is a flowchart showing a processing executed by a device in the information processing system.

As shown in FIG. 2, the device driver 12 first causes the timer 121 to start, and sets the suspend flag 122 to zero, to thus perform initialization (S11). Next, the device driver 12 determines whether or not the suspend flag 122 is one (S12).

When the suspend flag 122 assumes a value of one (when Yes is selected in S12), the device driver 12 performs suspending processing, and returns to step S12 (S20). The suspending processing will be described later.

When the suspend flag 122 is not one (when No is selected in S12), the device driver 12 determines whether or not any request from the application 11 has been received (S13).

When a request has been received (when Yes is selected in S13), processing complying with a received request is performed (S16). Moreover, when the executed request corresponds to an inquiry command such as a status inquiry command from the printer 20 or a data request command to the printer 20 (when Yes is selected in S17), processing immediately returns to step S12. When the executed request does not correspond to the inquiry command (when No is selected in S17), processing returns to step S12 after the timer 121 has been cleared. For instance, when a print request command has been received, the timer 121 is cleared.

When the request has not been received in step S13 (when No is selected in S13), the device driver 12 determines whether or not a time measured by the timer 121 has elapsed a prescribed time period and a time-out has come (S14). When a time-out has not come (when No is selected in S14), processing returns to step S12.

In the meantime, when a time-out has come in step S14 (when Yes is selected in S14), the device driver 12 sets the suspend flag 122 to one, and establishes a suspended state (S15).

Figure 3:
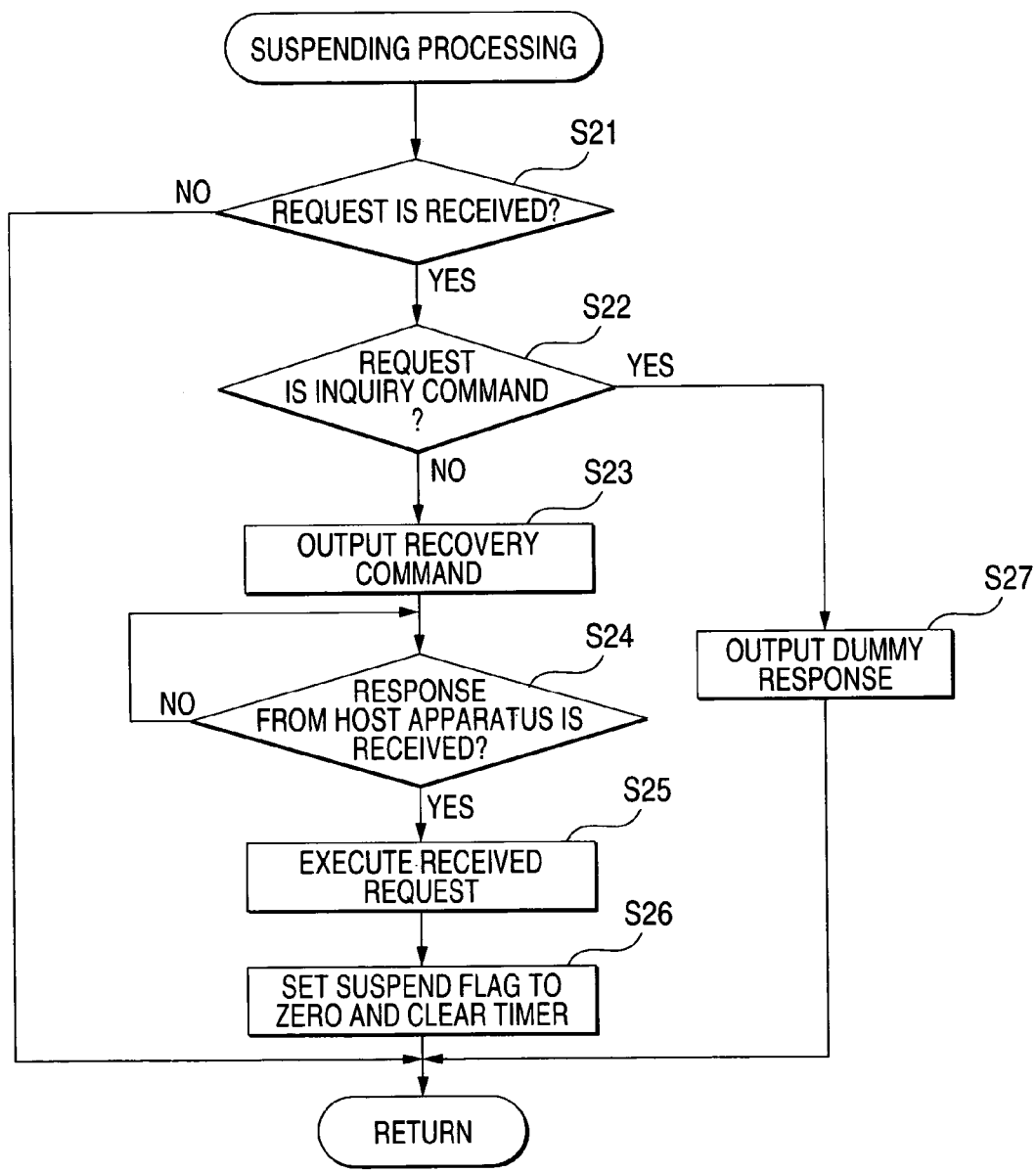
FIG. 3 is a flowchart showing a processing executed when the device is in a suspended state.

Next, the suspending processing of the device driver 12 will be described with reference to FIG. 3.

The device driver 12 determines whether or not any request from the application 11 has been received (S21). When no request has been received (when No is selected in S21), suspending processing is terminated.

When the request has been received (when Yes is selected in S21), a determination is made as to whether or not the received command corresponds to the inquiry command (S22).

When the received command corresponds to the inquiry command (when Yes is selected in S22), a dummy response corresponding to the inquiry command is returned to the application 11, and terminates the suspending processing (S27). For instance, a dummy response to the status inquiry command may be a response showing a normal status. Further, a dummy response to the data request command may be a response not having data.

Thus, in the suspended state, the device driver 12 returns a dummy response to an inquiry command periodically output from the application 11, and does not notify the printer 20 of the inquiry command. Accordingly, so long as a command other than the inquiry command is not issued by the application 11, the printer 20 is not notified of the command. When this state has continued for a while, the USB host controller 14 and the USB device controller 21 proceed to the suspended state, and the printer 20 also establishes a power-saving mode.

When the command received in step S22 does not correspond to an inquiry command (when No is selected in S22), the device driver 12 outputs, to the USB host controller 14, a return command used for returning the USB host controller 14 and the USB device controller 21 from the suspended state (S23).

Upon receipt of the return command, the USB host controller 14 returns the USB device controller 21 to a normal state, and restores itself into a normal state. When the USB device controller 21 has returned to a normal state, the entire printer 20 also returns from the power-saving mode to the normal mode.

The device driver 12 waits for a return completion response from the USB host controller 14, and performs processing for executing the received request (S24, S25). Concurrently, the device driver 12 sets the suspend flag 122 to zero; clears the timer 121; and terminates suspending processing (S26).

Thus, even when the inquiry command periodically issued by the application 11 has been received, the USB host controller 14 and the USB device controller 12 are held in a suspended state. Consequently, the printer 20 can be continually held in a power-saving mode. In the meantime, when a command for activating the printer, such as a print request, has been issued by the application 11, the printer 20 can quickly return to a normal state and can execute the command.

When an event requiring notification of a change in status to the host apparatus 10 has occurred while the printer 20 is in the power-saving mode, the printer 20 returns to a normal state according to the following procedures.

Figure 4:
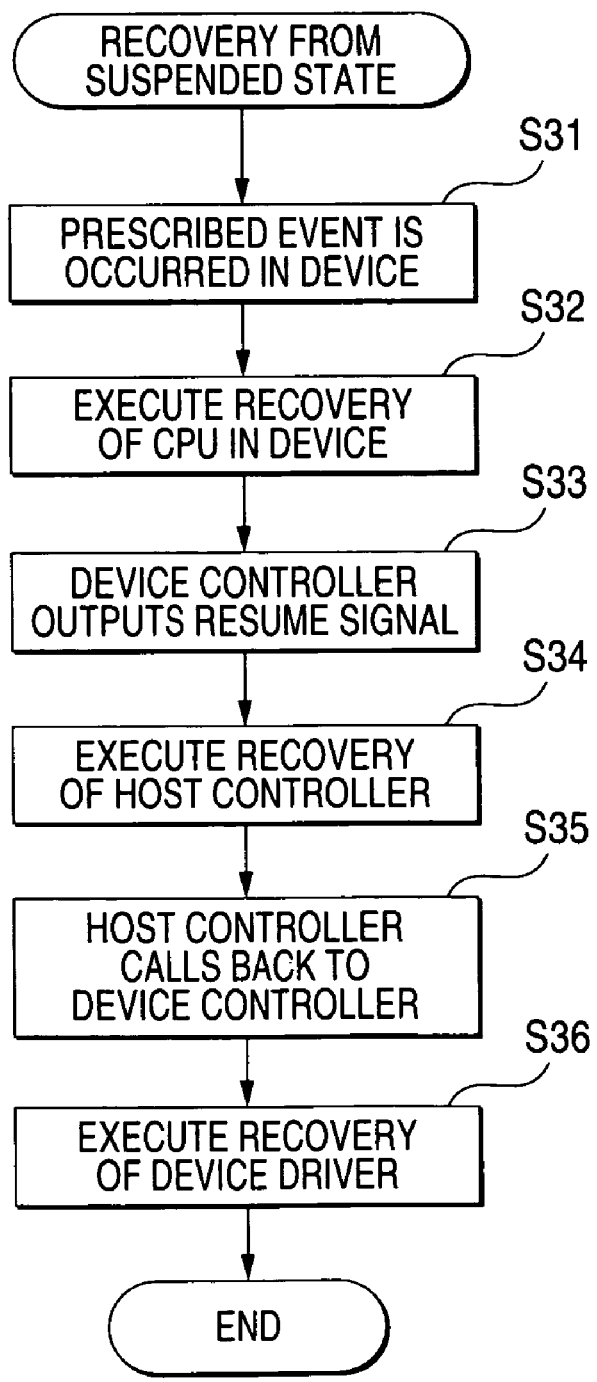
FIG. 4 is a flowchart showing a recovery processing executed when the device is recovered from the suspended state.

FIG. 4 shows procedures for returning the printer 20 to the normal state in association with occurrence of an event.

First, when a prescribed event has occurred in the printer 20, the CPU 22 of the printer 20 returns from the power-saving mode to the normal mode (S31, S32). Moreover, the USB device controller 21 following the CPU 22 returns from the suspended state, and outputs a resume signal to the USB host controller 14 (S33).

The USB host controller 14 having received a resume signal from the USB device controller 21 returns from the suspended state; and sends, to the device driver 12, a call-back showing that the USB host controller 14 has returned from the suspended state (S34, S35).

Upon receipt of the call-back, the device driver 12 sets the suspend flag 122 to zero, and returns from the suspended state (S36).

Consequently, the inquiry command issued by the application 11 from then on is notified to the printer 20 until a time-out comes. Consequently, the application 11 can ascertain a change having occurred in the status of the printer 20.

Although only some exemplary embodiments of the invention have been described in detail above, those skilled in the art will readily appreciate that many modifications are possible in the exemplary embodiments without materially departing from the novel teachings and advantages of the invention. Accordingly, all such modifications are intended to be included within the scope of the invention.

For instance, this embodiment has described a combination of the host apparatus with the printer. However, the present invention can be applied to a device other than the printer. Moreover, communication established between the host apparatus and the device is not limited to the USB scheme. The present invention can be applied to any communication system, so long as communication is established while a host apparatus is taken as a master and a device is taken as a slave.

What is claimed is:

1. An information processing system, comprising:
a host apparatus, serving as a master;
a device, communicatively connected to the host apparatus and serving as a slave, the device being configured to establish a power-saving mode when any command is not received from the host apparatus for a first prescribed time period; and
a device driver, provided in the host apparatus, the device driver being configured to transit from a normal state to a suspended state when an operation command for operating the device is not received from an application running in the host apparatus for a second prescribed time period, and to transmit a dummy response to the application, when an inquiry command is received from the application while the device driver is placed in the suspended state, without notifying the inquiry command to the device.

2. The information processing system as set forth in claim 1, further comprising:
a USB device controller provided in the device; and a USB host controller provided in the host apparatus and adapted to perform communications by way of a USB, with the USB device controller.

3. The information processing system as set forth in claim 2, wherein: the device driver is configured to transit from the suspended state to the normal state, when the USB host controller receives a resume signal from the USB device controller.

4. The information processing system as set forth in claim 1, wherein:
the device is a printer; and the inquiry command includes a command for inquiring a status of the printer or a command for inquiring a presence of a request from the printer to the host apparatus.

5. The information processing system as set forth in claim 1, wherein:
the device is a printer; and the operation command is a command for causing the printer to perform printing.

6. A host apparatus, adapted to serve as a master when the host apparatus is communicatively connected to a device serving as a slave and configured to establish a power-saving mode when any command is not received from the host apparatus for a first prescribed time period, the host apparatus comprising:
a device driver, configured to be placed in a suspended state when an operation command for operating the device is not received from an application running in the host apparatus for a second prescribed time period, and to transmit a dummy response to the application, when an inquiry command is received from the application while the device driver is placed in the suspended state, without notifying the inquiry command to the device.

7. A power saving method executed in an information processing system in which a host apparatus and a device are communicatively connected such that the host apparatus serves as a master and the device serves as a slave, the method comprising:
running an application in the host apparatus;
placing the host apparatus in a suspended state when an operation command for operating the device is not received from the application;
transmitting a dummy response to the application, when an inquiry command is received from the application while the host apparatus is placed in the suspended state, without notifying the inquiry command to the device; and establishing a power-saving mode of the device when the device receives no command from the host apparatus for a prescribed time period.

8. A program product comprising a computer-readable medium recording a program causing a computer to execute a method comprising:

running an application in the host apparatus;

placing a host apparatus in a suspended state when an operation command for operating the device is not received from the application;

transmitting a dummy response to the application, when an inquiry command is received from the application while the host apparatus is placed in the suspended state, without notifying the inquiry command to the device; and establishing a power-saving mode of a device when the device receives no command from the host apparatus for a prescribed time period.

* * * * *

UNITED STATES PATENT AND TRADEMARK OFFICE
CERTIFICATE OF CORRECTION

PATENT NO.        : 7,721,131 B2
APPLICATION NO. : 11/606710
DATED             : May 18, 2010
INVENTOR(S)       : Akio Takamoto It is certified that error appears in the above-identified patent and that said Letters Patent is hereby corrected as shown below:

In the claims should read

8. A program product comprising a computer-readable medium recording a program causing a computer to execute a method comprising:

running an application in [[the]] a host apparatus;

placing [[the]] a host apparatus in a suspended state when an operation command for operating [[the]] a device is not received from the application;

transmitting a dummy response to the application, when an inquiry command is received from the application while the host apparatus is placed in the suspended state, without notifying the inquiry command to the device; and establishing a power-saving mode of [[the]] a device when the device receives no command from the host apparatus for a prescribed time period.

Signed and Sealed this

Twenty-second Day of June, 2010

David J. Kappos
*Director of the United States Patent and Trademark Office*